United States Patent
Limbacher

(10) Patent No.: US 9,784,094 B2
(45) Date of Patent: Oct. 10, 2017

(54) SYSTEM AND METHOD FOR DRILL PIPE TALLYING

(71) Applicant: NATIONAL OILWELL VARCO, L.P., Houston, TX (US)

(72) Inventor: Christopher Lee Limbacher, Missouri City, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 340 days.

(21) Appl. No.: 14/396,703

(22) PCT Filed: Apr. 30, 2013

(86) PCT No.: PCT/US2013/038749
§ 371 (c)(1),
(2) Date: Oct. 23, 2014

(87) PCT Pub. No.: WO2013/165943
PCT Pub. Date: Nov. 7, 2013

(65) Prior Publication Data
US 2015/0114634 A1    Apr. 30, 2015

Related U.S. Application Data

(60) Provisional application No. 61/640,294, filed on Apr. 30, 2012.

(51) Int. Cl.
E21B 47/04    (2012.01)
E21B 47/09    (2012.01)
(Continued)

(52) U.S. Cl.
CPC ............ *E21B 47/09* (2013.01); *E21B 17/006* (2013.01); *E21B 19/10* (2013.01); *E21B 47/04* (2013.01);
(Continued)

(58) Field of Classification Search
CPC .......... E21B 19/06; E21B 19/07; E21B 19/10; E21B 19/16; E21B 47/09; E21B 47/122;
(Continued)

(56) References Cited

U.S. PATENT DOCUMENTS 5,202,680 A  *  4/1993  Savage ................. E21B 17/006
                                                        175/40
2005/0230109 A1    10/2005  Kammann
(Continued)

OTHER PUBLICATIONS

International Search Reort and Written Opinion dated Jun. 27, 2014, for International Application No. PCT/US2013/038749, International Filing Date Apr. 30, 2013.

*Primary Examiner* — Hai Phan
*Assistant Examiner* — Franklin Balseca
(74) *Attorney, Agent, or Firm* — Conley Rose, P.C.

(57) ABSTRACT

A method for drill pipe tallying includes detecting that a drill bit (14) has tripped in through a rig floor and monitoring movement of a drawworks (6) that supports the drill bit and a length of drill pipe. If a tag interrogating device does not detect a wireless tag (26) associated with a set of slips, the method includes counting the movement of the drawworks toward a drill pipe tally. If a tag interrogating device detects a wireless tag associated with a set of slips, the method includes not counting the movement of the drawworks toward the drill pipe tally. The tag interrogating device is positioned at a fixed location relative to the rig floor.

20 Claims, 5 Drawing Sheets

(51) Int. Cl.
  *E21B 47/12*    (2012.01)
  *E21B 19/06*    (2006.01)
  *E21B 19/07*    (2006.01)
  *E21B 19/10*    (2006.01)
  *E21B 19/16*    (2006.01)
  *E21B 17/00*    (2006.01)
  *G06K 19/07*    (2006.01)

(52) U.S. Cl.
  CPC .......... *G06K 19/0723* (2013.01); *E21B 19/06* (2013.01); *E21B 19/07* (2013.01); *E21B 19/16* (2013.01); *E21B 47/122* (2013.01); *F16L 2201/60* (2013.01)

(58) Field of Classification Search
  CPC . E21B 17/006; E21B 47/04; G06K 19/07758; G06K 2017/0077; G06K 19/0723; F16L 2201/60; H04Q 2209/47
  See application file for complete search history.

(56) References Cited

U.S. PATENT DOCUMENTS

| | | | |
|---|---|---|---|
| 2009/0121895 A1* | 5/2009 | Denny | ................... E21B 47/122 340/854.1 |
| 2011/0137162 A1* | 6/2011 | Bruce | ............... A61M 5/14546 600/432 |

* cited by examiner

FIG. 2A
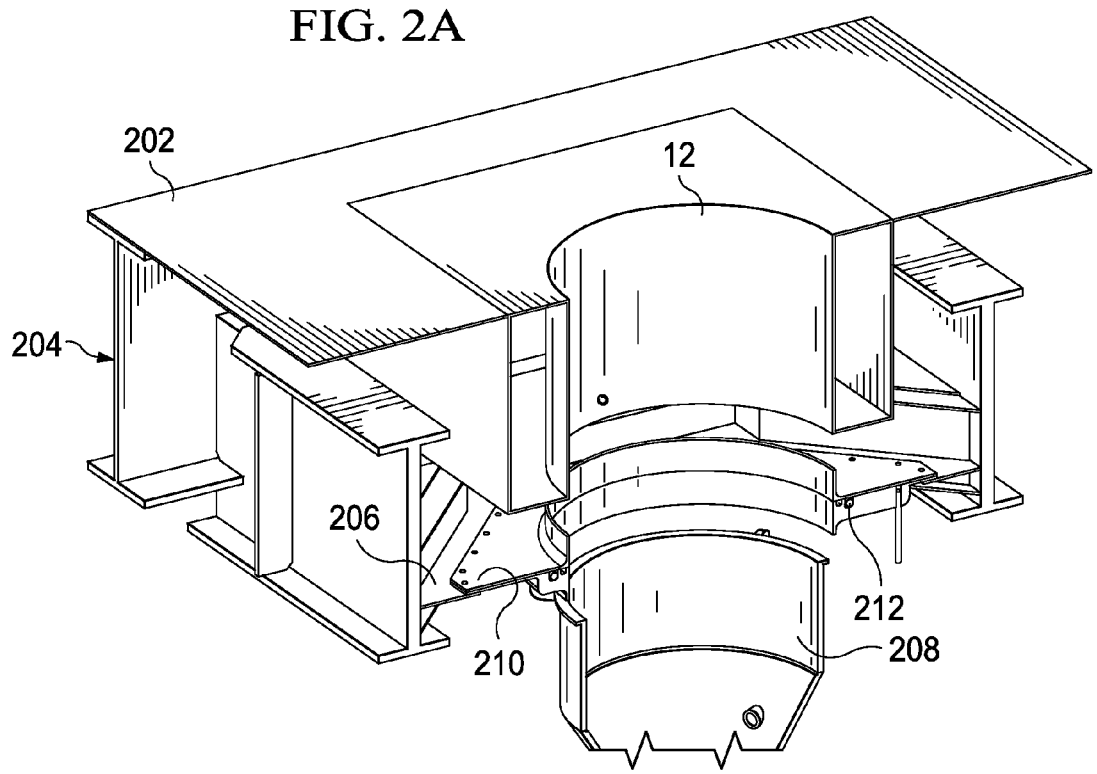
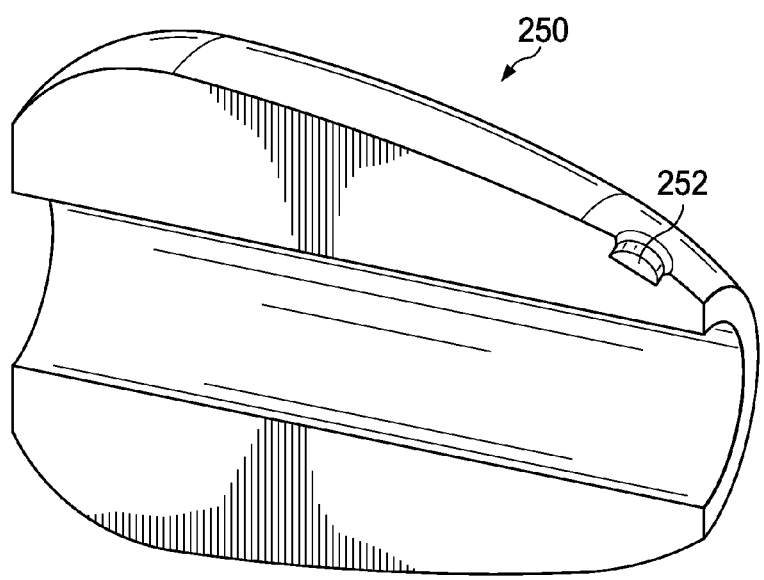
FIG. 2B

SYSTEM AND METHOD FOR DRILL PIPE TALLYING

CROSS-REFERENCE TO RELATED APPLICATIONS

This application is a 35 U.S.C. §371 national stage application of PCT/US2013/038749, filed Apr. 30, 2013, entitled "System and Method for Drill Pipe Tallying," which claims the benefit of Provisional Application No. 61/640,294, filed Apr. 30, 2012, entitled "System and Method for Drill Pipe Tallying," both of which are incorporated herein by reference in their entirety for all purposes.

BACKGROUND

During hydrocarbon drilling operations, it is advantageous to keep track of the trip status, particularly by maintaining a drill string tally to keep track of the current drill string length and what components are downhole. Drill pipe tallying may be performed by one or more individuals working on the rig who keep track of the net length of pipe that has passed through the rig floor since tripping in. However, relying on humans to keep track of large amounts of drill pipe both entering and exiting the rig floor, depending on the drilling situation, is cumbersome and prone to errors and mistakes in calculations.

BRIEF DESCRIPTION OF THE DRAWINGS

For a detailed description of exemplary embodiments of the invention, reference will now be made to the accompanying drawings in which:

FIG. 2A shows a perspective, cross-section view of a rotary table including a wireless tag interrogating device in accordance with various embodiments;

FIG. 2B shows an exemplary slip for receiving a wireless tag for identification of the slip in accordance with various embodiments;

NOTATION AND NOMENCLATURE

Figure 1:
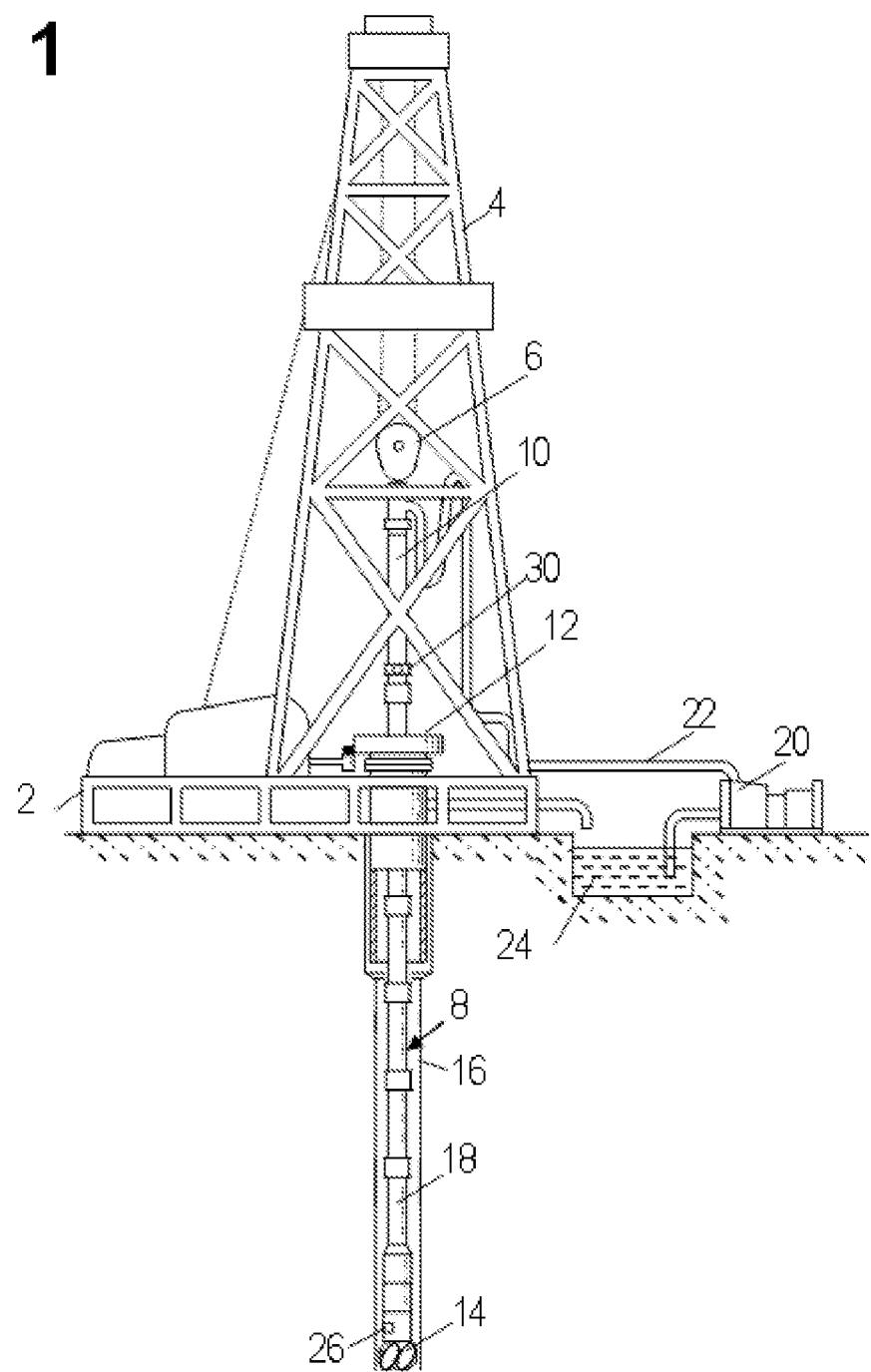
FIG. 1 shows a drilling system including wireless tags in accordance with various embodiments.

In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION OF DISCLOSED EMBODIMENTS

The following discussion is directed to various embodiments of the invention. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Wireless identification devices (i.e., tags), such as radio-frequency identification (RFID) tags and similar devices may be attached to, or incorporated into, an object to enable relatively easy and quick wireless identification of the object. Most wireless tags include circuitry for storing and processing information related to the object to which the tag is attached, and an antenna for receiving and transmitting a signal carrying such information. The information transmitted by the wireless tag is acquired by a tag querying system that may be portable or assigned to fixed location. To communicate, wireless tags respond to queries from the querying system by generating response signals that are received by the querying system. The response signals contain information about the object to which the wireless tag is attached.

To reduce the amount of reliance on human record-keeping, a wireless tag may be attached to each section of drill pipe. A querying system such as a remote scanner may be used by a human near the well center to scan each pipe that enters or exits the wellbore. However, this method of drill pipe tallying is unpleasant for the operator of the scanner and still requires a significant amount of human intervention to keep track of the drill pipe tally.

In other techniques, the movement of the drawworks may be monitored to determine a drill pipe tally. For example, if there is weight on bit ("WOB") while the drawworks is moving, then it can be assumed that the drill string is also moving, and thus the amount of drawworks movement is equivalent to the length of drill pipe being added to the drill string, and thus is added to the total tally. A computer, rather than a human, may monitor the drawworks movement and WOB, reducing the amount of human interaction required to maintain the drill pipe tally. However, certain situations may still cause a drill pipe tally computed in this manner to be less precise than is desirable.

First, during the initial drilling phase, there may not be enough WOB to trigger a sensor on the load cell to indicate that there is actually any weight being placed on the bit. The load cell is required to measure millions of pounds, and thus it may not have sufficient granularity to indicate that there is any WOB when only the initial segments of drill pipe are being used. As a result, the first several lengths of drill pipe might not be counted towards the drill pipe tally by the monitoring computer. Thus, human interaction is again required to correct this miscalculation and, as above, such human interaction may be unreliable in certain situations.

Second, during drilling, the drill string may be periodically suspended from the rig floor through the use of slips that grip the drill string and support it from the rig floor when the drill string is not supported by the drawworks. During these periods, the drawworks may be used to hoist other objects. Due to the weight of certain other objects, the hoisting activity might be recorded by the monitoring computer as counting towards the drill pipe tally. However, because the drill pipe is actually suspended by the slips and not moving relative to the wellbore, the drill pipe tally is actually unchanging during these periods. Again, human interaction is required to correct this miscalculation and, as above, such human interaction may be unreliable in certain situations. As a result, in either of the above situations in which drilling personnel must manually update the tally, the potential for error or miscalculation is introduced into the process of calculating the drill pipe tally.

In accordance with various embodiments, a tag interrogating device, such as an RFID antenna, is positioned below a rotary table that is supported by a rig floor. The tag interrogating device may sit above a bell nipple, if present, that is coupled to the bottom of the rotary table, such that wireless tags passing through the rotary table or being placed inside the rotary table are detected by the tag interrogating device. In some cases, for example where a top drive is used to drive the drill string, the rotary table may not be required or present, and thus the tag interrogating device may be supported by other structures that are positioned below the rig floor, such that wireless tags passing through the rig floor (e.g., when tripping in/out) are detected by the tag interrogating device.

As briefly explained above, slips are positioned around the drill pipe and placed into a bowl supported by the rotary table to prevent pipe from slipping down into the hole when the pipe is not supported by the drawworks (e.g., when additional sections of drill pipe are being added to the drill string so as to continue drilling further). Thus, when the slips are engaged (i.e., gripping the drill string and positioned in the rotary table), drawworks movement cannot contribute to the drill pipe tally, since the drill string is stationary when the slips are engaged.

In accordance with various embodiments, a wireless tag is integrated into the body of the slips in a location that is proximate the tag interrogating device beneath the rotary table when the slips are engaged. In some embodiments, the slips may not extend beyond or to the end of the rotary table; however, the location of the wireless tag in the slips is such that communication between the tag interrogating device and the wireless tag is enabled when the slips are engaged. The tag interrogating device may constantly (or intermittently at a very rapid rate) poll for the presence of a wireless tag. When the tag interrogating device receives a response from a wireless tag having a tag identification value that is associated with slips (e.g., in a tag identification value database or table), a monitoring system does not count drawworks movement toward the drill pipe tally. Conversely, when the tag interrogating device does not receive a response from a wireless tag that is associated with slips, the monitoring system counts drawworks movement toward the drill pipe tally, since the slips are not in place and the drawworks is thus supporting the drill string.

Additionally, in some embodiments, the bit or a portion of the drill string proximate the bit also comprises a wireless tag with a tag identification value, which is different than the tag identification value of the slips and is associated with the bit, as above, in a tag identification value database or table. When the bit passes through the rotary table, the tag interrogating device receives a response from the wireless tag associated with the bit, and may cause the monitoring system to begin keeping a drill pipe tally (if tripping in) or to finalize a drill pipe tally (if tripping out). As above, the drill pipe tally may be kept by monitoring drawworks movement when a wireless tag associated with the slips is not detected by the tag interrogating device. This prevents the driller from being required to manually indicate when tripping in begins, which reduces the likelihood of error or miscalculation. In some embodiments, both the tag interrogating device and the wireless tag are designed to operate using low-frequency RFID, which enhances transmission near the rotary table and surrounding metal structures. In other embodiments, both the tag interrogating device and the wireless tag are designed to operate using high-frequency or surface acoustic wave (SAW) RFID.

FIG. 1 shows a drilling system in accordance with various embodiments. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various subsurface formations. A pump 20 circulates drilling fluid through a feed pipe 22 to kelly 10, downhole through the interior of drill string 8, through orifices in drill bit 14, back to the surface via the annulus around drill string 8, and into a drilling fluid reservoir 24, such as a mud tank or retention pit. The drilling fluid transports cuttings from the borehole into the reservoir 24 and aids in maintaining the borehole integrity.

The drill string 8 is made up of various components, including drill pipe 18 and bottom hole assembly components (e.g., bit 14, mud motor, drill collar, tools, etc.). In embodiments of the present disclosure, some drill string components, for example drill pipe 18 and the drill bit 14 or a section of drill pipe 18 proximate the drill bit, include a wireless tag 26 that may be detected by a tag interrogating device (not shown in FIG. 1) located near the rotary table 12 and/or that may measure and record borehole environmental parameters and/or drill string component operational parameters. The wireless tag 26 may be integrated into a package formed from Polyetheretherketone ("PEEK") or other thermoplastics or materials suitable for use in a downhole environment.

FIG. 2A shows a cut-away view of the rotary table 12 in further detail. The rotary table 12 is supported by a rig floor 202 and rotary beams 204. A rotary pan 206 forms the bottom of the rotary table 12 and is positioned above a bell nipple 208. In accordance with various embodiments, an antenna housing 210 is coupled to the rotary pan 206 beneath the rotary table 12. The antenna housing 210 houses a tag interrogating device (tag reader) 212, which may comprise a loop antenna, a ferrite rod antenna, or other antennas configured to interact with a wireless tag, such as a low-frequency RFID or RuBee tag (e.g., wireless tag 26). In particular, the tag reader 212 constantly (or at a very rapid rate) polls for the presence of a wireless tag 26 and may identify wireless tags 26 based on an associated tag identification value.

Turning now to FIG. 2B, an exemplary slip 250 is shown in accordance with various embodiments. The slip 250 is shown having a machined cutout 252 configured to receive a wireless tag 26, such as a low-frequency RFID or RuBee tag. The cutout 252 is positioned such that a wireless tag 26 placed in the cutout 252 is detected by the tag reader 212 beneath the rotary table 12 when the slips 250 are engaged. Referring to FIGS. 2A and 2B, although the tag reader 212 is shown positioned beneath the rotary table 12, the tag reader 212 may be positioned at a location any predetermined distance away from the rotary table 212 or rig floor 202 such that communication is possible between a wireless tag 26 in the slips 250 and the tag reader 212 when the slips 250 are engaged.

Similar to above, the wireless tag 26 may be integrated into a package formed from PEEK or other thermoplastics or materials suitable for use in a rugged surface environment. The wireless tag 26 placed in the cutout 252 includes a tag identification value that identifies the wireless tag 26 as being associated with the slip 250. For example, and as will be explained in further detail below, a tag identification value database or table may be maintained by a monitoring system such that when the tag reader 212 detects a particular tag identification value from a wireless tag 26, the monitoring system identifies a piece of equipment, tool, or the like that is associated with the detected wireless tag 26.

Figure 3:
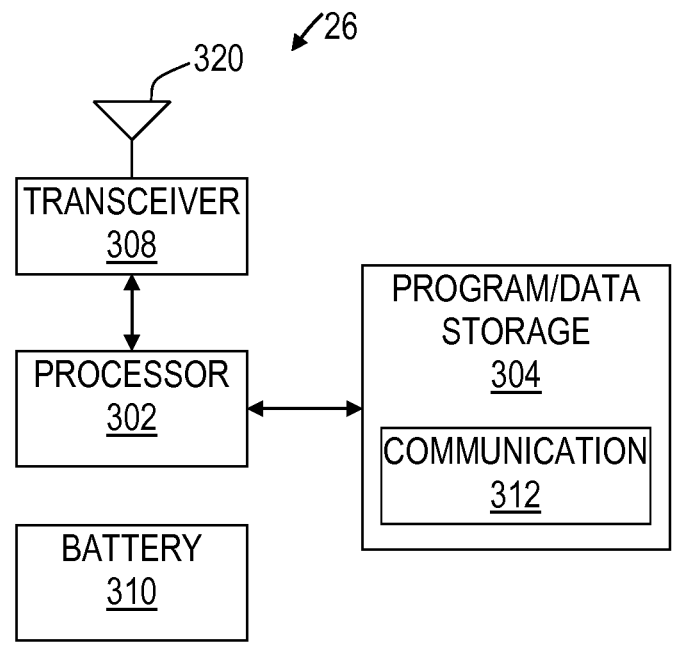
FIG. 3 shows a block diagram of a wireless tag in accordance with various embodiments.

FIG. 3 shows a block diagram of a wireless tag 26 in accordance with various embodiments. An embodiment of the tag 26 includes an antenna 320, a transceiver 308, a processor 302, program/data storage 304 and a power source (e.g., a battery 310). In some embodiments, the transceiver 308 operates in the long wavelength band (<500 KHz) to wirelessly communicate with the tag reader 212. The antenna 320 converts signals provided to or from the transceiver 308 between conducted and airwave forms.

The processor 302 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 304 is a computer-readable medium coupled to and accessible to the processor 302. The storage 304 may include volatile and/or non-volatile semiconductor memory (e.g., FLASH memory, static or dynamic random access memory, etc.), or other appropriate storage media now known or later developed. Various programs executable by the processor 302, and data structures manipulatable by the processor 302 may be stored in the storage 304.

Communication programming 312 configures the processor 302 to execute the protocols required to communicate with the tag reader 212. Communication programming 312 may also cause the processor 302 to provide stored tag identification information to the tag reader 212.

Some embodiments of the wireless tag 26 may include a power system that omits the battery 310. Embodiments lacking the battery 310 may be powered by energy drawn from the magnetic waves generated by the tag reader 212 and detected by the antenna 320. Information (e.g., tag 26 identification information) may be stored in the program/data storage 404 for transmission by the tag 26 when the tag communicates with the tag reader 212. For example, the tag reader 212 may continually or rapidly poll any tag within range for its tag identification information; when the wireless tag 26 receives such a poll (e.g., via the antenna 320), the communication programming 312 may cause the processor 302 to transmit the tag's 26 identification information via the antenna 320 to the tag reader 212.

Figure 4:
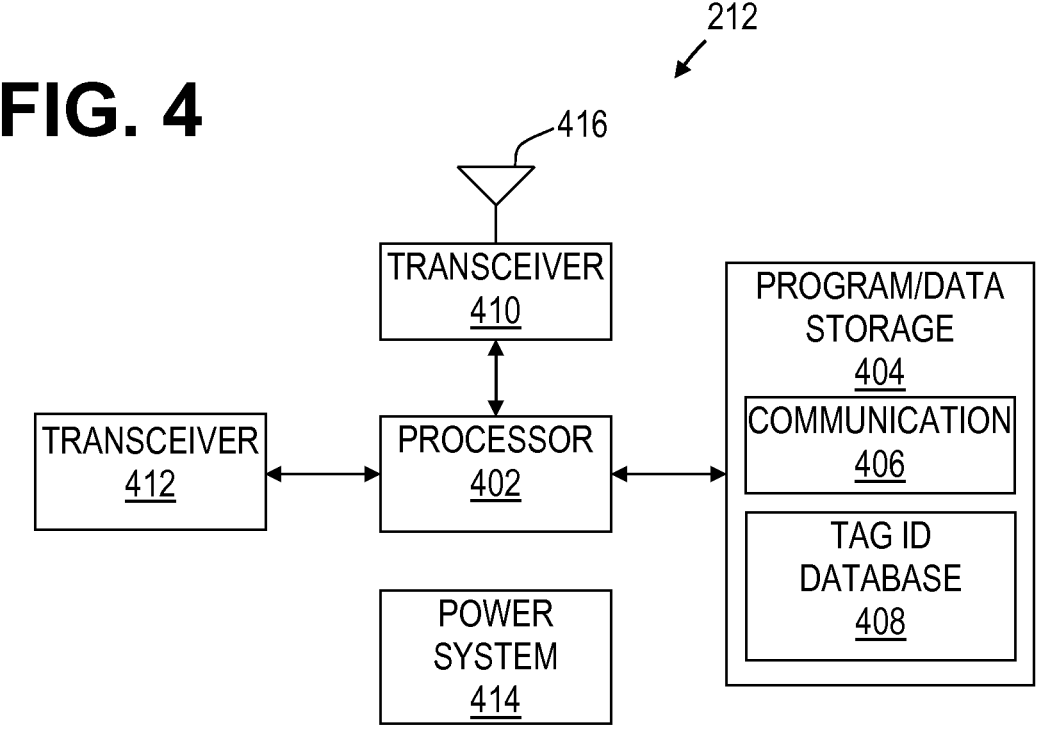
FIG. 4 shows a block diagram of a wireless tag interrogating device in accordance with various embodiments.

FIG. 4 shows a block diagram of a wireless tag reader (tag reader) 212 in accordance with various embodiments. An embodiment of the tag reader 212 includes an antenna 416, a transceiver 410, a processor 402, program/data storage 404, and a power system 414. As explained above the transceiver 410 may operate in the long wavelength band (<500 KHz) to wirelessly communicate with the wireless tag 26. The antenna 416 converts signals provided to or from the transceiver 410 between conducted and airwave forms. As explained above, the antenna 416 may comprise a loop antenna, a ferrite rod antenna, or other antennas configured to interact with a wireless tag. The antenna 416 is preferably located beneath the rotary table 12 of a drilling rig so that wireless tags 26 that pass through the rotary table 12 are detected by the tag reader 212. Some embodiments of the tag reader 212 also include a wired or wireless transceiver 412 (e.g., Ethernet, IEEE 802.3, IEEE 802.11, Bluetooth, etc.) to couple the tag reader 212 to a monitoring system, for example to aid in keeping a drill pipe tally.

The processor 402 is configured to execute instructions read from a computer readable medium, and may, for example, be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 404 is a computer-readable medium coupled to and accessible to the processor 402. The storage 404 may include volatile and/or non-volatile semiconductor memory (e.g., FLASH memory, static or dynamic random access memory, etc.), or other appropriate storage media now known or later developed. Various programs executable by the processor 402, and data structures manipulatable by the processor 402 may be stored in the storage 404.

The communication software programming 406 stored in the storage 404 configures the processor 402 to execute the protocols required to detect the presence of the wireless tag 26, establish a communication session with the detected tag 26, and wirelessly retrieve information, including tag identification information from the tag 26.

Information (e.g., identification information) retrieved from the wireless tag 26 may be stored in storage 404 and compared against entries in a tag identification database 408 to determine the tool or piece of equipment associated with the tag 26. In some embodiments, the communication software programming 406 configures the processor 402 to transmit the tag identification information to a surface facility (not shown) via transceiver 412. In some embodiments, the tag identification information is used by a monitoring system to aid in keeping a drill pipe tally.

The power system 414 may include converters that convert the voltages provided to the tag reader 212 via power conductors to the voltages needed to power the components of the tag reader 212. In some embodiments, the power system 414 comprises a battery and converters that convert the voltages provided by the battery to the voltages needed to power the components of the tag reader 212.

Figure 5:
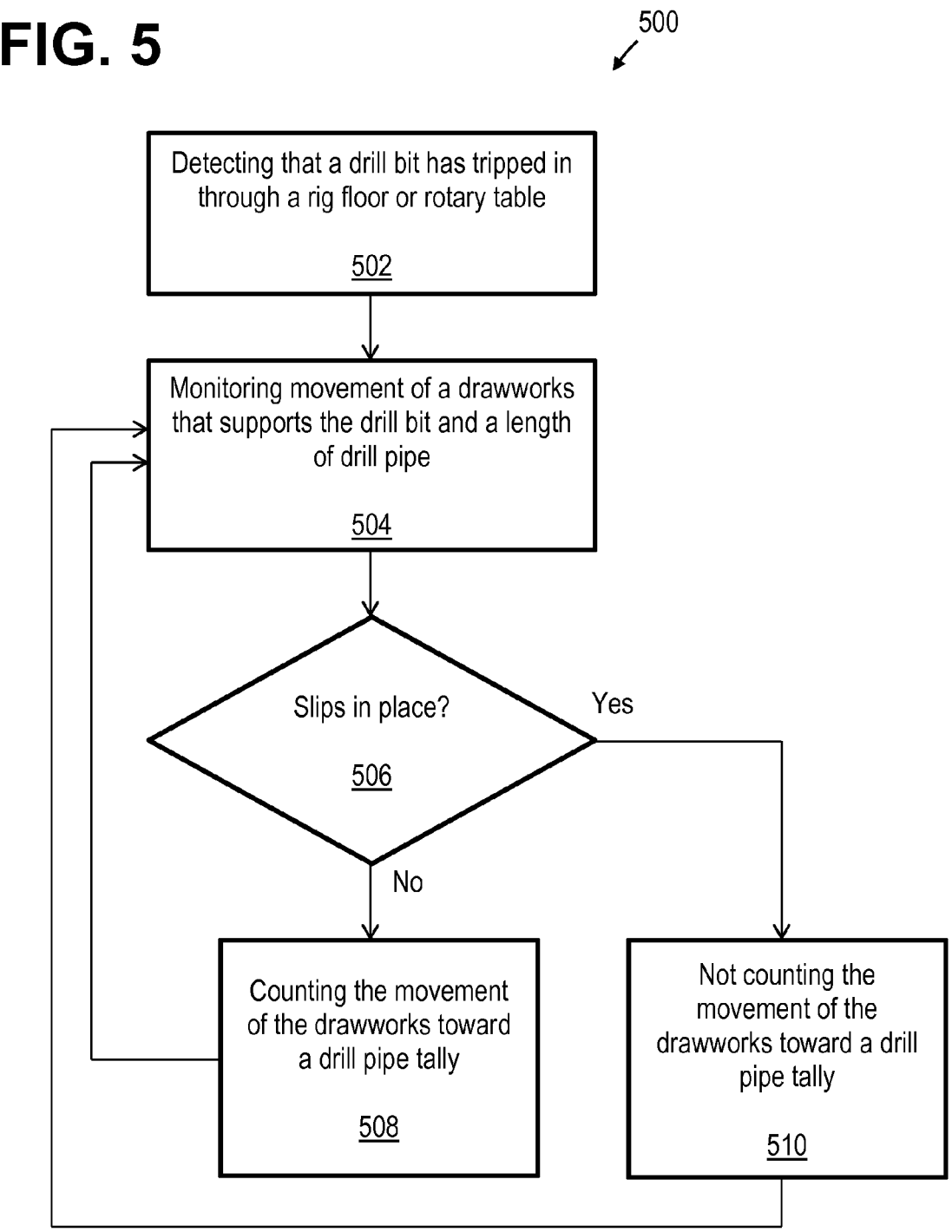
FIG. 5 shows a flow diagram for a method in accordance with various embodiments.

In accordance with various embodiments, FIG. 5 shows a flow diagram for a method 500 for maintaining a drill pipe tally based on a tag reader 212 that is positioned below the rotary table 12 or rig floor 202 detecting a wireless tag 26 associated with a set of slips. Though depicted sequentially as a matter of convenience, at least some of the actions shown can be performed in a different order and/or performed in parallel. Additionally, some embodiments may perform only some of the actions shown. In some embodiments, the operations of FIG. 5, as well as other operations described herein, can be implemented as instructions stored in a computer readable medium (e.g., storage 304, 404) and executed by one or more processors (e.g., processor 302, 402).

Referring to FIG. 5, the method begins in block 502 with detecting that a drill bit 14 has tripped in through a rig floor 202 or rotary table 12. In some cases, the drilling operator may signal to a monitoring system that the drill bit 14 has passed through the rig floor 202 or rotary table 12. In other embodiments, however, the drill bit 14 may comprise a wireless tag 26 containing tag identification information that indicates its association with the drill bit 14. A tag reader 212 positioned beneath the rig floor 202 or rotary table 12 is configured to read the tag identification information, which may cause the tag reader 212 to inform the monitoring system that the drill bit 14 has passed through the rig floor 202 or rotary table 12. In response to detection of the wireless tag 26 associated with the drill bit 14, the monitoring system may begin to keep a drill pipe tally (if tripping in) or cease keeping a drill pipe tally (if tripping out).

The monitoring system may keep the drill pipe tally by monitoring movement of a drawworks that supports the drill bit 14 and a length of drill pipe attached to the drill bit 14 as shown in block 504. The amount of drawworks movement may be ascertained through the use of position sensors associated with the traveling block 16 or sensors that determine how much wire has been let out or taken in from the drawworks spool, and by other such techniques and sensors.

The method 500 continues in block 506 and determines whether slips have been detected as being in place. As explained above, slips 250 may comprise a wireless tag 26 containing tag identification information that indicates its association with the slips 250. The wireless tag 26 is positioned within or along the slips 250 such that the tag reader 212 detects the wireless tag 26 associated with the slips 250 when the slips 250 are positioned in the rotary table 12 to support the drill string 8. When the slips 250 are in place, the drill string 8 is supported by the slips 250 and thus any drawworks movement does not correspond to movement of the drill string 8 in the wellbore 16. Conversely, when the slips 250 are not in place in the rotary table, the drill string 8 is supported by the drawworks and thus any drawworks movement corresponds to movement of the drill string 8 in the wellbore 16.

If the slips 250 are not in place, as determined in block 506, the method 500 continues to block 508 with counting the movement of the drawworks toward the drill pipe tally. As above, the tag reader 212 is configured to read the tag identification information from a wireless tag 26. If tripping in has occurred and there is no indication that the slips 250 are engaged in the rotary table 12, the tag reader 212 informs the monitoring system that the slips 250 are not present. In response to the slips 250 not being present, the monitoring system counts the monitored movement of the drawworks toward the drill pipe tally.

However, if the slips 250 are in place, as determined in block 506, the method 500 continues to block 510 with not counting the movement of the drawworks toward the drill pipe tally. As above, the tag reader 212 is configured to read the tag identification information from a wireless tag 26. If the tag reader 212, through polling for a wireless tag 26, determines that the slips are present at the rotary table 12, then the tag reader 212 informs the monitoring system that the slips 250 are present. In response to the slips 250 being present, the monitoring system does not count the monitored movement of the drawworks toward the drill pipe tally, since the drill string 8 is supported by the slips 250 and thus not moving in response to drawworks movement.

The method 500 continually monitors movement of the drawworks as in block 504 and the tag reader 212 continually polls for the presence of a wireless tag 26. Thus, when slips 250 are detected, movement of the drawworks is not counted toward the drill pipe tally, but when the slips 250 are removed by a rig worker, the tag reader 212 no longer detects the presence of slips 250 and thus the movement of the drawworks begins to be counted toward the drill pipe tally. As a result, no human interaction (aside from the insertion and removal of slips 250) is necessary to keep an accurate drill pipe tally, reducing the chances of miscalculation or human error. Additionally, the drawworks may be used to hoist any number of items while the slips 250 are in place without the concern of counting such movement toward the drill pipe tally. Further, in embodiments where the drill bit 14 includes a wireless tag 26, an indication of beginning a trip in may be accurately generated without concern for when WOB exceeds a threshold needed to indicate that drilling has begun or the like.

Figure 6:
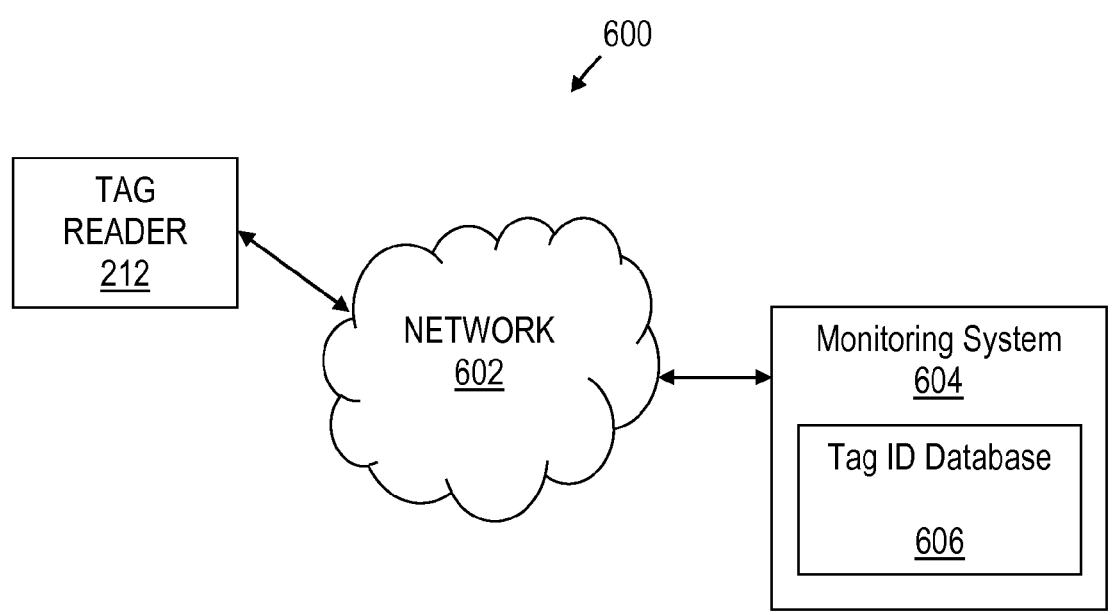
FIG. 6 shows a schematic diagram of a system for maintaining a drill pipe tally in accordance with various embodiments.

FIG. 6 shows a block diagram of a system 600 for processing information related to maintaining a drill pipe tally in accordance with various embodiments. The system includes a tag reader 212, a network 602, and a monitoring system 604. The tag reader 212 may be disposed beneath the rotary table 12 of the drilling platform 2 or elsewhere below the rig floor 202. The tag reader 212 may read information from wireless tags 26 such as tag identification information, which is associated with a particular type of tool or piece of equipment in a tag identification database 606 of the monitoring system 604. Alternately, the tag reader 212 may store such a database and, rather than transmitting raw tag identification information to the monitoring system 604, may transmit an indication of the type of tool or piece of equipment associated with a detected wireless tag 26.

Referring still to FIG. 6, the tag reader 212 may transmit the information via the network 602. The network 602 may comprise any available computer networking arrangement, for example, any one or a combination of a local area network ("LAN"), a wide area network ("WAN"), a metropolitan area network ("MAN"), the internet, etc., or may comprise a proprietary network. Further, the network 602 may comprise any of a variety of networking technologies, for example, wired, wireless, or optical techniques may be employed. Accordingly, the components of the system 600 are not restricted to any particular location or proximity to the tag reader 212.

The monitoring system 604 may, in addition to other functions, maintain a drill pipe tally based at least in part on information received from the tag reader 212. As explained above, drawworks movement may be monitored by the monitoring system 604 and counted toward the drill pipe tally in certain situations.

In synopsis, in some embodiments, a method for drill pipe tallying includes detecting that a drill bit has tripped in through a rig floor and monitoring movement of a drawworks that supports the drill bit and a length of drill pipe connected to the bit. If a tag interrogating device does not detect a wireless tag associated with a set of slips, the method includes counting the movement of the drawworks toward a drill pipe tally. If a tag interrogating device detects a wireless tag associated with a set of slips, the method includes not counting the movement of the drawworks toward the drill pipe tally. The tag interrogating device is positioned at a predetermined distance away from the rig floor such that communication is enabled between the wireless tag associated with the set of slips and the tag interrogating device when the set of slips are engaged. The tag interrogating device is positioned below the rig floor in the exemplary embodiment shown.

In other embodiments, a system for drill pipe tallying includes a set of slips comprising a tag configured for wireless communication, a tag interrogating device configured to wirelessly communicate with the tag and configured to detect the wireless tag associated with the set of slips, and a monitoring system communicably coupled to the tag interrogating device. The monitoring system is configured to monitor movement of a drawworks that supports a drill bit and a length of drill pipe, count the movement of the drawworks toward a drill pipe tally when the tag interrogating device does not detect the wireless tag associated with the set of slips, and not count the movement of the drawworks toward the drill pipe tally when the tag interrogating device detects the wireless tag associated with the set of slips. The tag interrogating device is positioned at a predetermined distance away from the rig floor such that communication is enabled between the wireless tag associated with the set of slips and the tag interrogating device when the set of slips are engaged. The tag interrogating device is positioned below a rig floor in the exemplary embodiment shown.

In other embodiments, a non-transitory computer-readable medium contains instructions that, when executed by a processor, cause the processor to detect that a drill bit has tripped in through a rig floor and monitor movement of a drawworks that supports the drill bit and a length of drill pipe. If a tag interrogating device does not detect a wireless tag associated with a set of slips, the instructions, when executed, cause the processor to count the movement of the drawworks toward a drill pipe tally. If a tag interrogating device detects a wireless tag associated with a set of slips, the instructions, when executed, cause the processor to not count the movement of the drawworks toward a drill pipe tally. The tag interrogating device is positioned at a predetermined distance away from the rig floor such that communication is enabled between the wireless tag associated with the set of slips and the tag interrogating device when the set of slips are engaged. The tag interrogating device is positioned below the rig floor in the exemplary embodiment shown.

The above discussion is meant to be illustrative of various embodiments of the present invention. Numerous variations and modifications will become apparent to those skilled in the art once the above disclosure is fully appreciated. For example, although the tag reader is described as being positioned below the rig floor, the tag reader may be positioned at any fixed location relative to the rig floor such that detection of the engagement of slips in the rig floor is possible. Similarly, in some embodiments, the location of the tag reader is such that detection of a drill bit at a known distance relative to the rig floor is possible. It is intended that the following claims be interpreted to embrace all such variations and modifications.

What is claimed is:

1. A method for drill pipe tallying, comprising:
   detecting that a drill bit has tripped in through a rig floor;
   monitoring movement of a drawworks that supports the drill bit and a length of drill pipe coupled to the drill bit;
   in response to a determination that a tag interrogating device does not detect a wireless tag associated with a set of slips, counting the movement of the drawworks toward a drill pipe tally; and
   in response to a determination that the tag interrogating device does detect the wireless tag associated with the set of slips, not counting the movement of the drawworks toward the drill pipe tally;
   wherein the tag interrogating device is configured to be positioned at a predetermined distance away from the rig floor such that communication is enabled between the wireless tag associated with the set of slips and the tag interrogating device.

2. The method of claim 1 wherein detecting that the drill bit has tripped in through the rig floor comprises detecting a wireless tag associated with the drill bit has passed through the rig floor.

3. The method of claim 1 wherein monitoring movement of the drawworks comprises monitoring the position of a traveling block or monitoring an amount of wire released from a drawworks spool.

4. The method of claim 1 wherein the tag interrogating device is housed in a housing coupled to a rotary pan below a rotary table.

5. The method of claim 4 wherein the tag interrogating device is above a bell nipple positioned below the rotary table.

6. The method of claim 1 wherein the tag interrogating device is positioned below the rig floor.

7. The method of claim 1 wherein
   the tag interrogating device is configured to be positioned at a predetermined distance away from the rig floor such that communication is enabled between the wireless tag associated with the set of slips and the tag interrogating device when the slips are engaged and such that communication is not enabled between the wireless tag associated with the set of slips and the tag interrogating device when the slips are not engaged.

8. A system for drill pipe tallying, comprising:
   a set of slips comprising a first wireless tag configured for wireless communication;
   a tag interrogating device configured to wirelessly communicate with the first wireless tag and configured to detect the first wireless tag; and
   a monitoring system communicably coupled to the tag interrogating device, the monitoring system configured to:
     monitor movement of a drawworks that supports a drill bit and a length of drill pipe;
     count the movement of the drawworks toward a drill pipe tally if in response to a determination that the tag interrogating device does not detect the first wireless tag; and
     not count the movement of the drawworks toward the drill pipe tally if in response to a determination that the tag interrogating device detects the first wireless tag;
   wherein the tag interrogating device is configured to be positioned at a predetermined distance away from a rig floor such that communication is enabled between the first wireless tag and the tag interrogating device.

9. The system of claim 8 wherein the monitoring system is further configured to detect that a drill bit has tripped in through the rig floor.

10. The system of claim 9 wherein the tag interrogating device is further configured to detect a second wireless tag, which causes the monitoring system to determine that the drill bit has passed through the rig floor, wherein the second wireless tag is associated with the drill bit.

11. The system of claim 8 wherein the monitoring system is configured to monitor the position of a traveling block or an amount of wire released from a drawworks spool to monitor the movement of the drawworks.

12. The system of claim 8 further comprising a housing for the tag interrogating device that is coupled to a rotary pan below a rotary table.

13. The system of claim 12 wherein the tag interrogating device is above a bell nipple positioned below the rotary table.

14. The system of claim 8 wherein the tag interrogating device is configured to be positioned at a predetermined distance away from the rig floor such that communication is enabled between the first wireless tag and the tag interrogating device when the slips are engaged.

15. The system of claim 14 wherein the monitoring system comprises a tag identification database that associates one or more tag identification values with either slips or a drill bit and the tag interrogating device is configured to:
  receive a tag identification value from a wireless tag; and
  transmit the tag identification value to the monitoring system.

16. The system of claim 8 wherein the tag interrogating device is positioned below the rig floor.

17. A non-transitory computer-readable medium containing instructions that, when executed by a processor, cause the processor to:
  detect that a drill bit has tripped in through a rig floor;
  monitor movement of a drawworks that supports the drill bit and a length of drill pipe;
  in response to a determination that a tag interrogating device does not detect a wireless tag associated with a set of slips, count the movement of the drawworks toward a drill pipe tally; and
  in response to a determination that the tag interrogating device does detect the wireless tag associated with the set of slips, not count the movement of the drawworks toward the drill pipe tally;
  wherein the tag interrogating device is configured to be positioned at a predetermined distance away from the rig floor such that communication is enabled between the wireless tag associated with the set of slips and the tag interrogating device.

18. The non-transitory computer-readable medium of claim 17 wherein the instructions, when executed by the processor, further cause the processor to receive an indication that the tag interrogating device detects that a wireless tag associated with the drill bit has passed through the rig floor.

19. The non-transitory computer-readable medium of 17 wherein the instructions, when executed by the processor, further cause the processor to monitor the position of a traveling block or monitor an amount of wire released from a drawworks spool to determine the movement of the drawworks.

20. The non-transitory computer-readable medium of claim 17 wherein
  the tag interrogating device is configured to be positioned at a predetermined distance away from the rig floor such that communication is enabled between the wireless tag associated with the set of slips and the tag interrogating device when the slips are engaged.

* * * * *